United States Patent
Lu et al.

(10) Patent No.: US 11,943,460 B2
(45) Date of Patent: Mar. 26, 2024

(54) VARIABLE BIT RATE COMPRESSION USING NEURAL NETWORK MODELS

(71) Applicant: QUALCOMM Incorporated, San Diego, CA (US)

(72) Inventors: Yadong Lu, Irvine, CA (US); Yang Yang, San Diego, CA (US); Yinhao Zhu, La Jolla, CA (US); Amir Said, San Diego, CA (US); Reza Pourreza, San Diego, CA (US); Taco Sebastiaan Cohen, Amsterdam (NL)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/573,568

(22) Filed: Jan. 11, 2022

(65) Prior Publication Data
US 2022/0224926 A1    Jul. 14, 2022

Related U.S. Application Data

(60) Provisional application No. 63/136,607, filed on Jan. 12, 2021.

(51) Int. Cl.
| | |
|---|---|
| *H04N 19/42* | (2014.01) |
| *H04N 19/124* | (2014.01) |
| *H04N 19/13* | (2014.01) |
| *H04N 19/136* | (2014.01) |
| *H04N 19/30* | (2014.01) |
| *H04N 19/36* | (2014.01) |

(52) U.S. Cl.
CPC ........... *H04N 19/42* (2014.11); *H04N 19/124* (2014.11); *H04N 19/13* (2014.11); *H04N 19/136* (2014.11); *H04N 19/30* (2014.11)

(58) Field of Classification Search
CPC ...... H04N 19/42; H04N 19/124; H04N 19/13; H04N 19/136; H04N 19/30
See application file for complete search history.

(56) References Cited

U.S. PATENT DOCUMENTS 11,544,881 B1 * 1/2023 Finlay ..................... G06T 9/002
11,558,620 B2 * 1/2023 Besenbruch ........... H04N 19/42

OTHER PUBLICATIONS

Choi Y., et al., "Variable Rate Deep Image Compression With a Conditional Autoencoder", 2019 IEEE/CVF International Conference on Computer Vision (ICCV), IEEE, Oct. 27, 2019, pp. 3146-3154, DOI: 10.1109/ICCV.2019.00324 [retrieved on Feb. 24, 2020].
International Search Report and Written Opinion—PCT/US2022/012177—ISA/EPO—dated Jun. 20, 2022.
Zhong Z., et al., "Channel-Level Variable Quantization Network for Deep Image Compression", arxiv.org, Cornell University Library, 201 Olin Library Cornell University, Ithaca, NY, 14853, Jul. 15, 2020, 10 Pages.

* cited by examiner

*Primary Examiner* — Jae N Noh
(74) *Attorney, Agent, or Firm* — Seyfarth Shaw LLP

(57) ABSTRACT

A computer-implemented method for operating an artificial neural network (ANN) includes receiving an input by the ANN. The ANN generates a latent representation of the input. The latent representation is communicated according to a bit rate based on a learned latent scaling parameter. The latent scaling parameter is learned based on a channel index and a tradeoff parameter value that corresponds to a value that balances the bit rate and a distortion.

18 Claims, 14 Drawing Sheets

VARIABLE BIT RATE COMPRESSION USING NEURAL NETWORK MODELS

CROSS-REFERENCE TO RELATED APPLICATION

The present application claims the benefit of U.S. Provisional Patent Application No. 63/136,607, filed on Jan. 12, 2021, and titled "VARIABLE BIT RATE COMPRESSION USING NEURAL NETWORK MODELS," the disclosure of which is expressly incorporated by reference in its entirety.

FIELD OF DISCLOSURE

Aspects of the present disclosure generally relate to neural networks, and more particularly, image compression using artificial neural networks.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks have successful application in multimedia compression such as video compression and image compression. Image compression is beneficial for communicating multimedia such as images and videos. However, users may have different computer architectures with different compute capabilities and may be operating such devices under different network conditions. Providing multiple bit rates may allow for more data to be transmitted or a higher quality image when more compute capabilities are available or under better network conditions, or less data or a lower quality image when compute capabilities are limited or network condition are poor. Under conventional techniques, separate models would be trained for different bit rates to provide multiple bit rates, and thus may be computationally inefficient and costly from a storage perspective.

SUMMARY

The present disclosure is set forth in the independent claims, respectively. Some aspects of the disclosure are described in the dependent claims.

In an aspect of the present disclosure, a computer-implemented method for operating an artificial neural network (ANN) is provided. The computer-implemented method includes receiving an input by the ANN. The computer-implemented method also includes generating, via the ANN, a latent representation of the input. The computer-implemented method further includes communicating the latent representation according to a bit rate based on a learned latent scaling parameter.

In another aspect of the present disclosure, an apparatus for operating an artificial neural network (ANN) is provided. The apparatus includes a memory and one or more processors coupled to the memory. The processor(s) are configured to receive an input by the ANN. The processor(s) are also configured to generate, via the ANN, a latent representation of the input. The processor(s) are further configured to communicate the latent representation according to a bit rate based on a learned latent scaling parameter.

In another aspect of the present disclosure, an apparatus for operating an artificial neural network (ANN) is provided. The apparatus includes means for receiving an input by the ANN. The apparatus also includes means for generating, via the ANN, a latent representation of the input. The apparatus further includes means for communicating the latent representation according to a bit rate based on a learned latent scaling parameter.

In another aspect of the present disclosure, a non-transitory computer readable medium is provided. The computer readable medium has encoded thereon program code for operating an artificial neural network (ANN). The program code is executed by a processor and includes code to receive an input by the ANN. The program code also includes code to generate, via the ANN, a latent representation of the input. The program code further includes code to communicate the latent representation according to a bit rate based on a learned latent scaling parameter.

In another aspect of the present disclosure, a computer-implemented method for operating an artificial neural network (ANN) is provided. The computer-implemented method includes receiving an input bit stream by the ANN. The computer-implemented method also includes applying a learned latent scaling parameter to the input bit stream recover a latent representation of an input. The computer-implemented method further includes decoding, via the ANN, the latent representation to generate a reconstruction of the input.

In another aspect of the present disclosure, an apparatus for operating an artificial neural network (ANN) is provided. The apparatus includes a memory and one or more processors coupled to the memory. The processor(s) are configured to receive an input bit stream by the ANN. The processor(s) are also configured to apply a learned latent scaling parameter to the input bit stream recover a latent representation of an input. The processor(s) are further configured to decode, via the ANN, the latent representation to generate a reconstruction of the input.

In another aspect of the present disclosure, an apparatus for operating an artificial neural network (ANN) is provided. The apparatus includes means for receiving an input bit stream by the ANN. The apparatus also includes means for applying a learned latent scaling parameter to the input bit stream recover a latent representation of an input. The apparatus further includes means for decoding, via the ANN, the latent representation to generate a reconstruction of the input.

In another aspect of the present disclosure, a non-transitory computer readable medium is provided. The computer readable medium has encoded thereon program code for operating an artificial neural network (ANN). The program code is executed by a processor and includes code to receive an input bit stream by the ANN. The program code also includes code to apply a learned latent scaling parameter to the input bit stream recover a latent representation of an input. The program code further includes code to decode, via the ANN, the latent representation to generate a reconstruction of the input.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
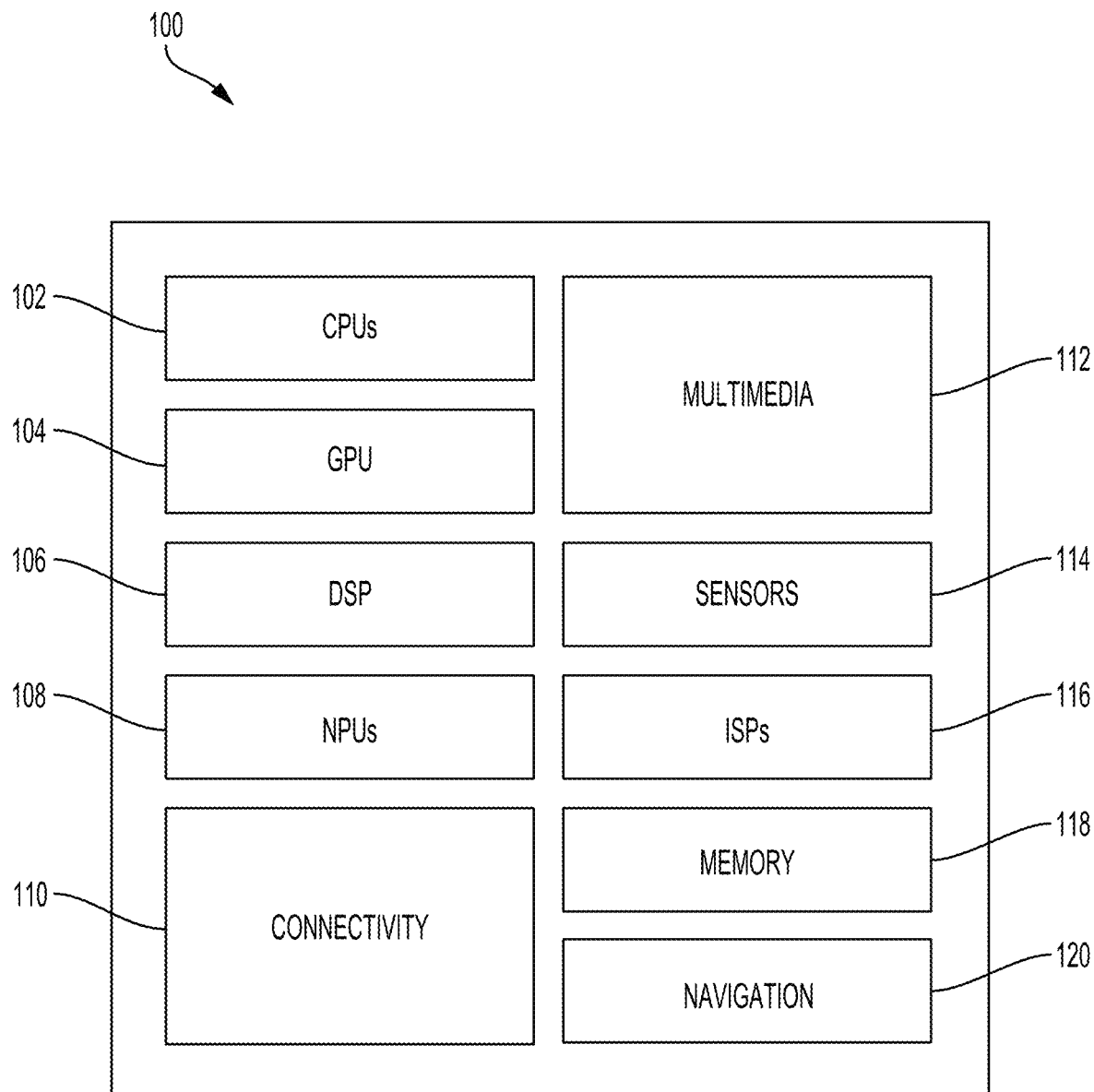
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks have successful application in multimedia compression such as video compression and image compression. Image compression is beneficial for communicating multimedia such as images and videos. However, users may have different computer architectures with different compute capabilities and may be operating such devices under different network conditions. Providing a variable bit rate may allow for more data to be transmitted or a higher quality image when more compute capabilities are available or under better network conditions, or less data or a lower quality image when compute capabilities are limited or network condition are poor. Under conventional techniques, separate models would be trained for different bit rates to provide a variable bit rate, and thus are computationally inefficient and costly from a storage perspective.

Aspects of the present disclosure are directed to learning an ordered representation for providing a variable bit rate via an artificial neural network. The learned ordered representation enables an embedded coding in which the highest-rate coded bits embed lower-rate coded bits. That is, a low bit rate code may be obtained by truncating a high bit rate stream. Accordingly, in some aspects, the learned ordered representation may enable broadcast to different users with a single bit stream. With unequal error protection (UEP), users with better or clean channel conditions may decode more, or in some cases all, latent channels while users with poor channel conditions may decode fewer, and in some aspects, only the more important channels.

FIG. 1 illustrates an example implementation of a system-on-a-chip (SOC) 100, which may include a central processing unit (CPU) 102 or a multi-core CPU configured for operating an artificial neural network (e.g., a neural end-to-end network) to provide image compression and communication. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive an input by an artificial neural network (ANN). The general-purpose processor 102 may also include code to generate, via the ANN, a latent representation of the input. The general-purpose processor 102 may further include code to communicate the latent representation according to a bit rate based on a learned latent scaling parameter.

In another aspect of the present disclosure, the instructions loaded into the general-purpose processor 102 may include code to receive an input bit stream by an artificial neural network (ANN). The general-purpose processor 102 may also include code to apply a learned latent scaling parameter to the input bit stream recover a latent representation of an input. The general-purpose processor 102 may further include code to decode, via the ANN, the latent representation to generate a reconstruction of the input.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training.

Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
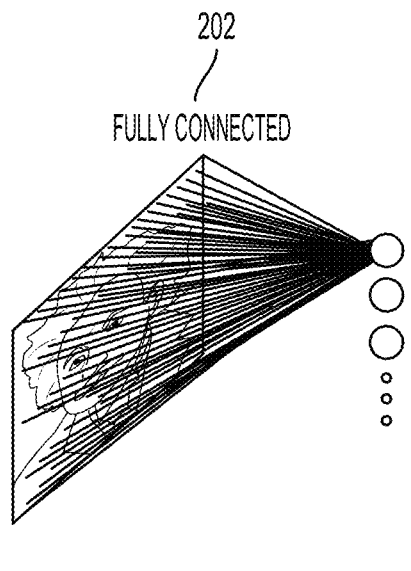
FIGS. 2A, 2B, and 2C are diagrams illustrating a neural network, in accordance with aspects of the present disclosure.
Figure 2B:
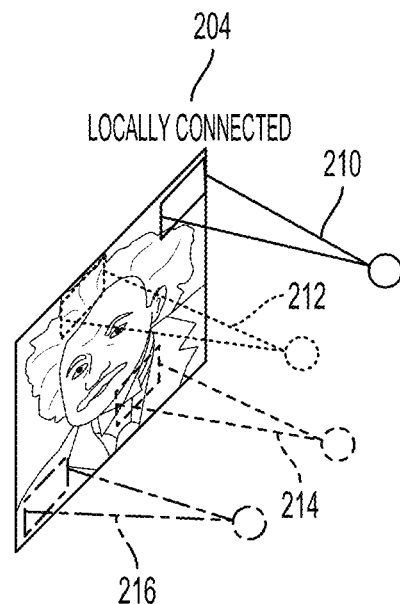

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
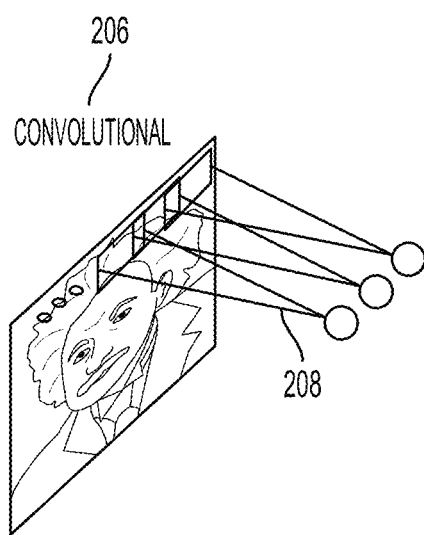

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
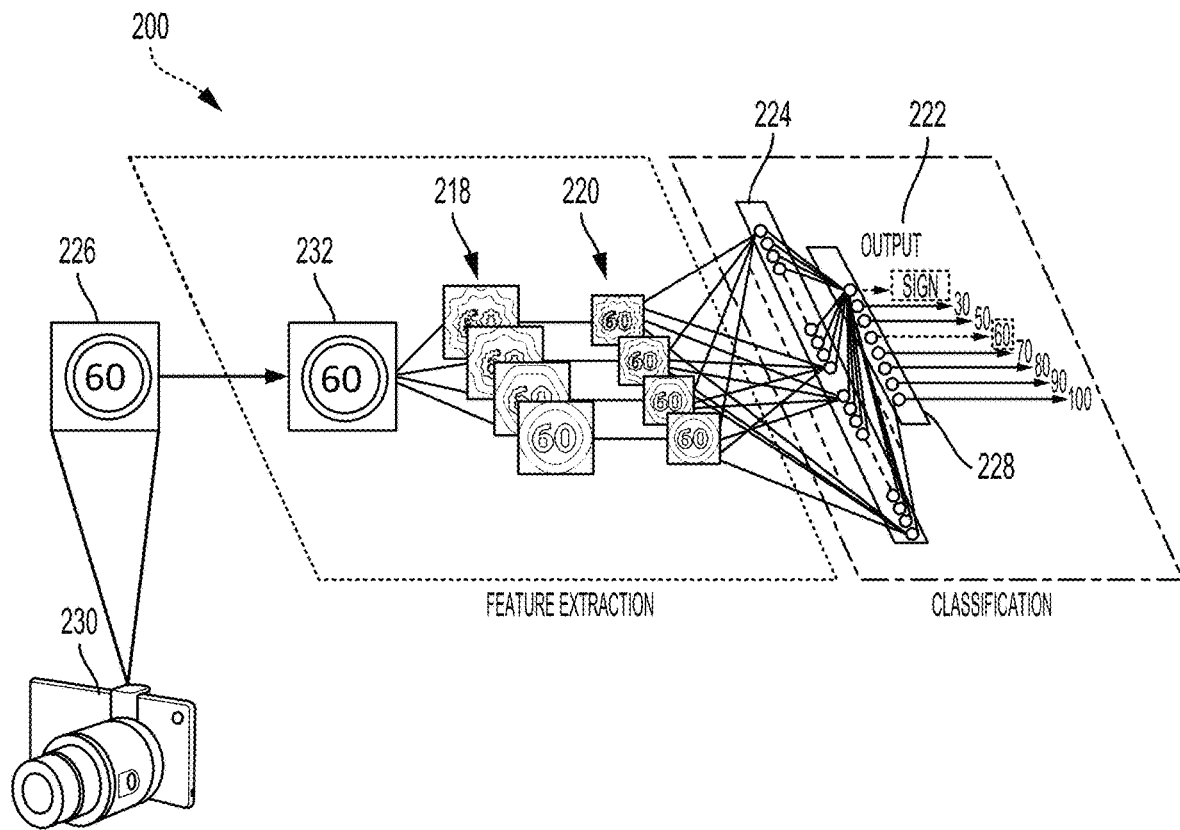
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). A RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
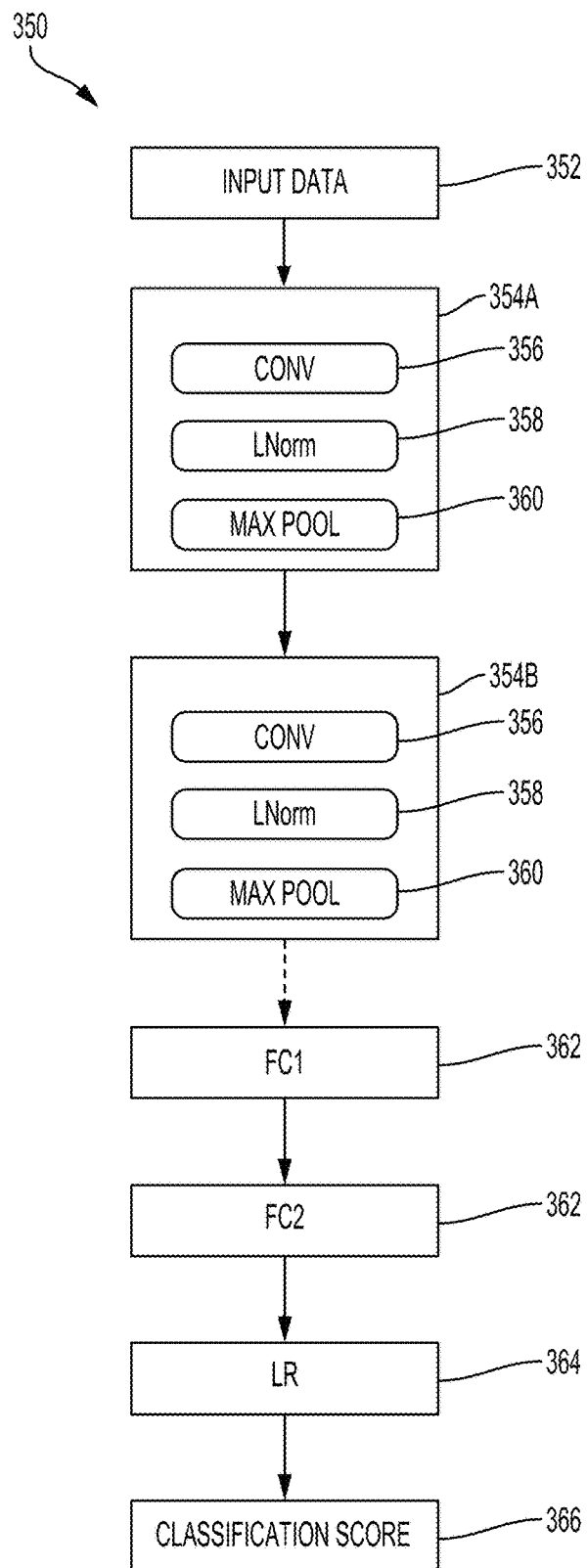
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
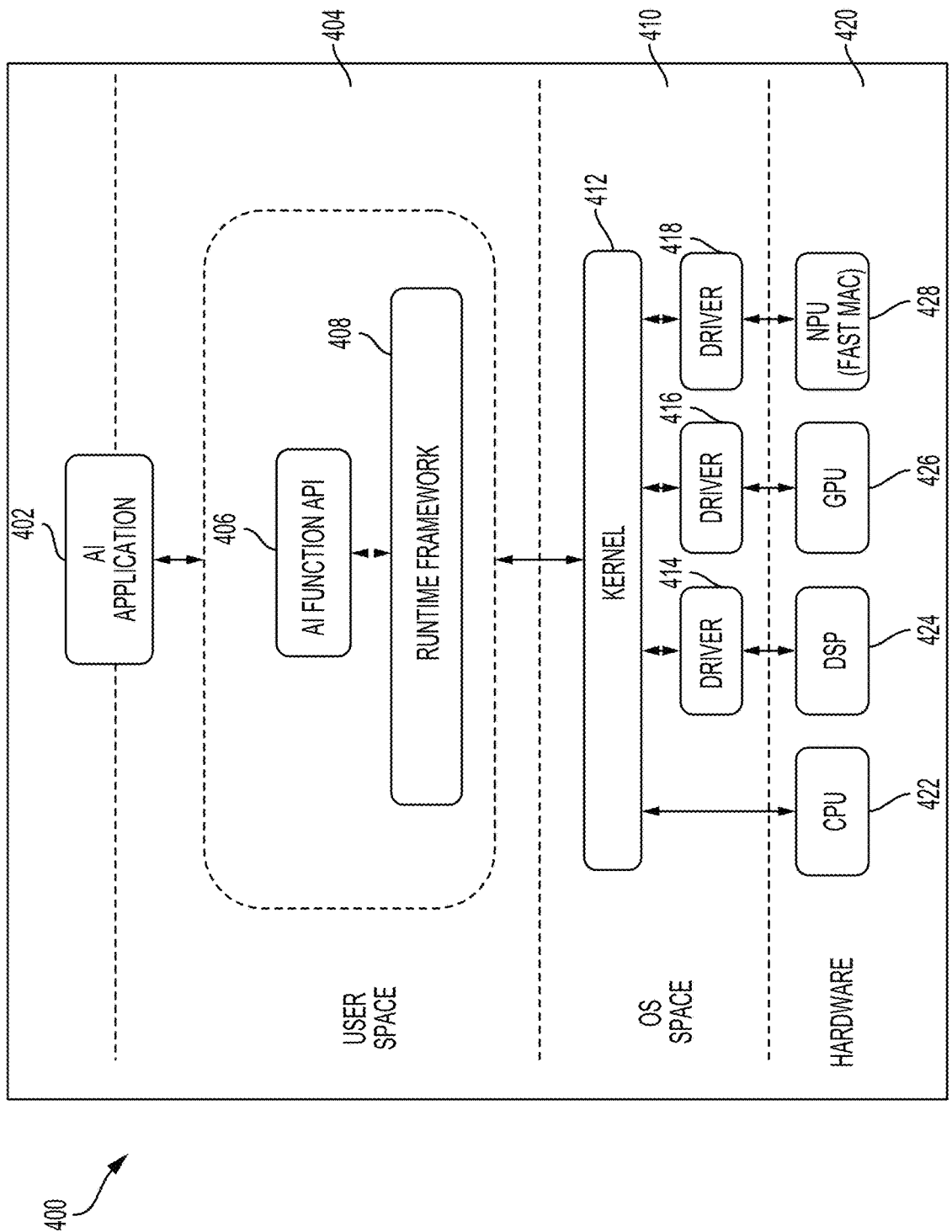
FIG. 4 is a block diagram illustrating an exemplary software architecture 400 that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example, a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Aspects of the present disclosure are directed to a neural variable bit rate model through soft nested dropout.

Figure 5:
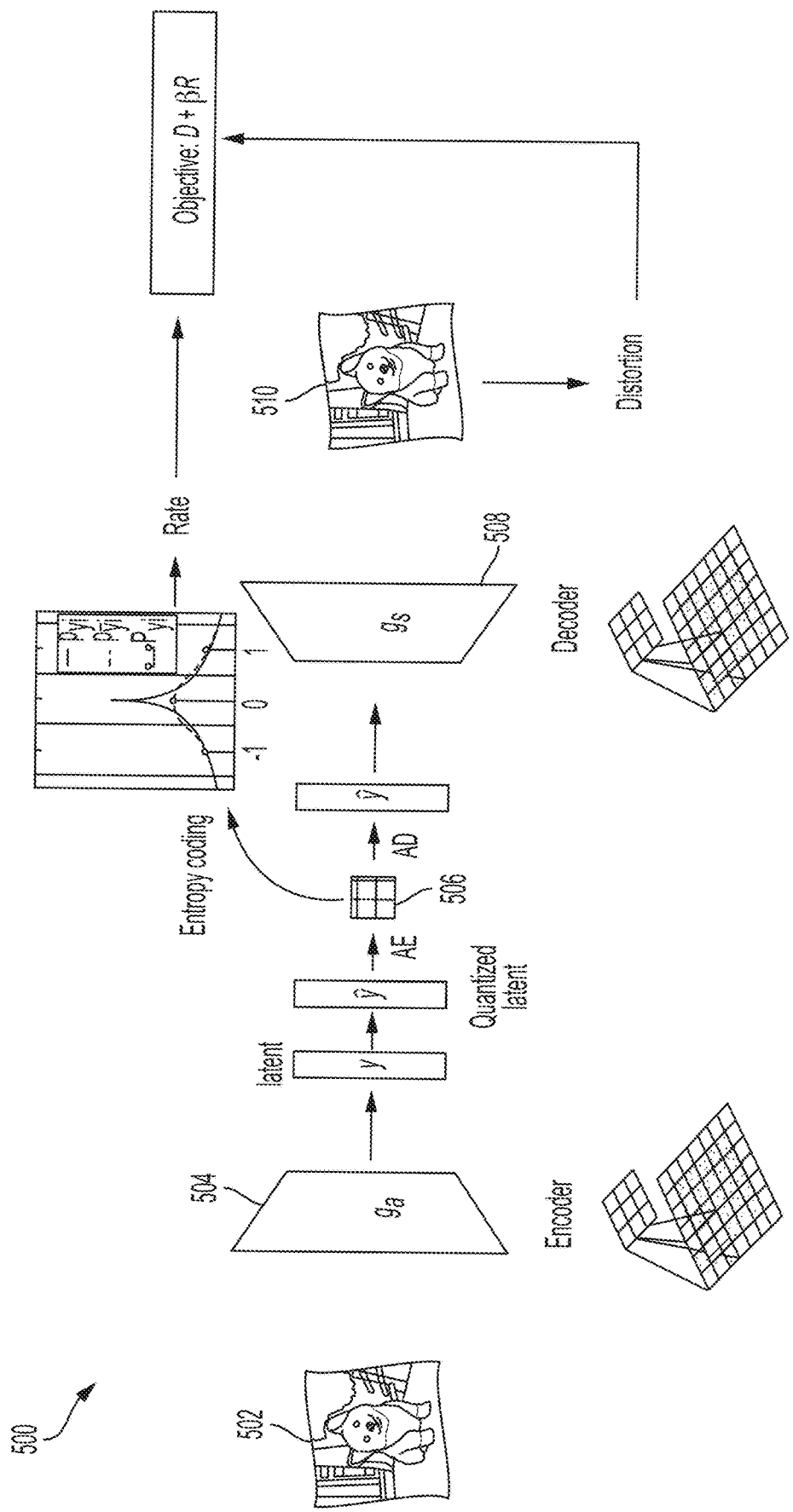
FIG. 5 is a block diagram illustrating an example architecture of a variable bit rate model, in accordance with aspects of the present disclosure.

FIG. 5 is a block diagram illustrating an example architecture 500 of the variable bit rate model, in accordance with aspects of the present disclosure. Referring to FIG. 5, the example architecture 500 includes an encoder 504, and a decoder 508. An input 502 may be received by the encoder 504. The input 502 may be a visual input such as a video or an image, for example. The encoder 504 may be a convolutional neural network (CNN), for example. The encoder 504 may process the image and perform a nonlinear transform parameterized via layers of the CNN to produce a latent representation y of the input 502. The latent representation y of the input 502 may be quantized (e.g., round floating point number into an integer) to produce a quantized latent representation 9. The quantized latent representation 9 may be subjected to arithmetic encoding (AE) and communicated via a bit stream 506. Then on the decoder side, the received bit stream 506 may be subjected to arithmetic decoding (AD) to reproduce the quantized latent 9 which is subjected to sense transform via the decoder 508, which may be parameterized by several layers of a CNN. Accordingly, the decoder 508 produces a reconstructed image 510.

In accordance with aspects of the present disclosure, the architecture 500 (e.g., an artificial neural network (ANN)) may be trained according to an objective function given by D+PR, where D is a distortion, R is a rate and is a LaGrange multiplier. Using the objective function, the ANN may be trained to balance the rate R (amount of bits) and distortion D. The rate R corresponds to a number of bits from an entropy coding phase and determines how much information to send. The distortion D may be calculated as a difference between the reconstructed image 510 and the original input 502 (e.g., original image). The LaGrange multiplier may be a trade-off parameter used to balance the tradeoff of the two objectives—reducing distortion and reducing the bit rate used to transmit the input.

Figure 6A:
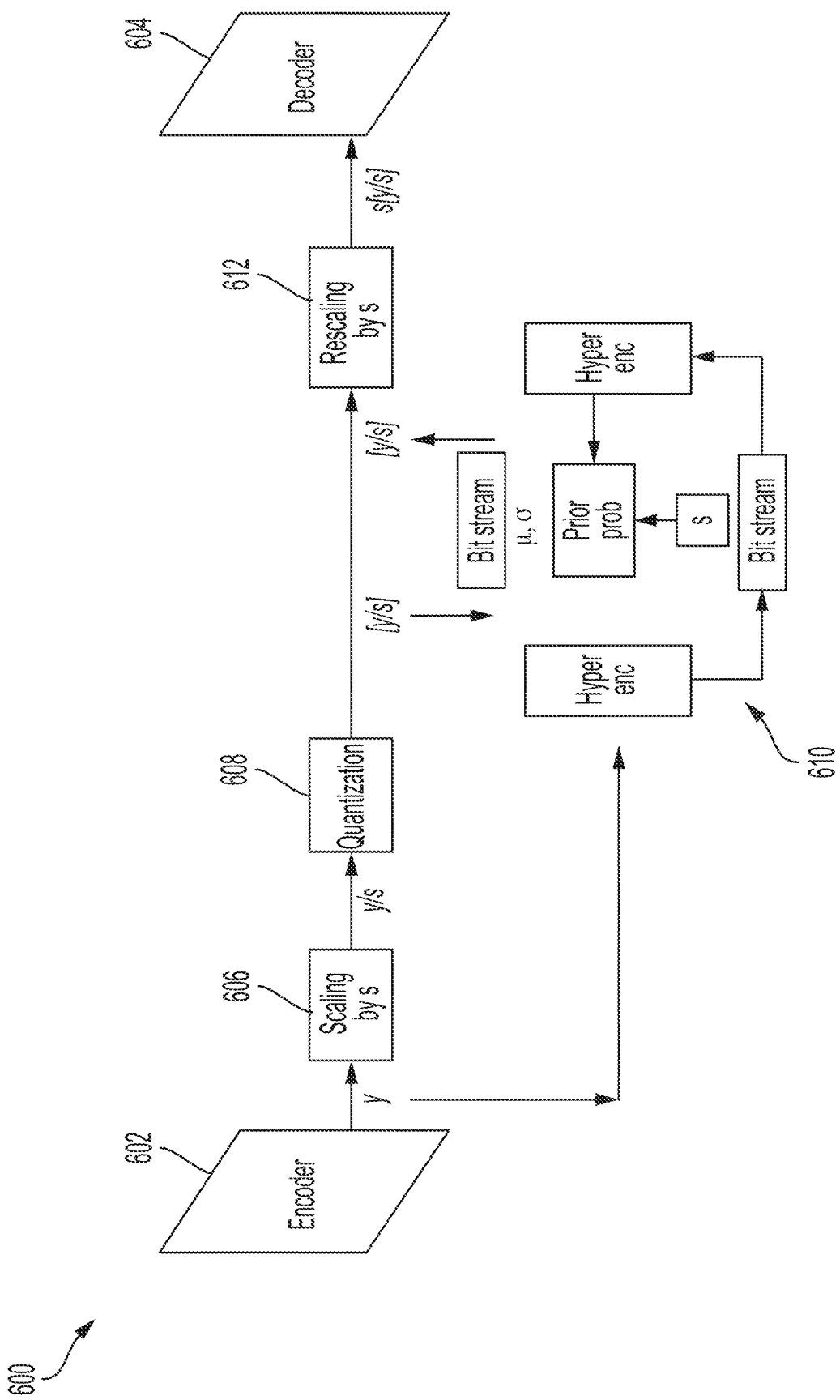
FIG. 6A is a block diagram illustrating an example architecture for a variable bit rate model, in accordance with aspects of the present disclosure.

FIG. 6A is a block diagram illustrating an example architecture 600 for a variable bit rate model, in accordance with aspects of the present disclosure. Referring to FIG. 6A, the example architecture 600 may be an artificial neural network. In some aspects, the architecture 600 may be configured as an autoencoder, for example. The architecture 600 is configured to provide a bit stream at a variable bit rate via latent scaling. In doing so, the architecture 600 provides a method for continuously controlling latent capacity or rate. The architecture 600 includes an encoder 602 and a decoder 604. The encoder 602 receives an input and transforms the input, such as an image, into a latent representation y. The latent representation may be supplied to a scaling block 606, in which a learnable latent scaling parameter s is applied to the latent representation y. The latent scaling parameter s may facilitate learning of an ordered representation. In some aspects, the latent scaling parameter s may be dependent on a channel index c. A channel may be viewed as a portion of the latent representation y. Each of the channels maybe combined to fully reconstruct the image. However, there may be some redundancy between channels of an image. The redundancy may lead to processing delays. To reduce the processing delays, one or more redundant channels may be intelligently dropped.

A mapping between the latent scaling parameter s and the channel index c of the may be learned such that when the channel index c is larger (e.g., to send more channels), the latent scaling parameter s becomes larger, for example. For any given latent channel, the latent scaling parameter s controls the amount of information in the channel. The larger the latent scaling parameter s, the less information in the channel. In contrast, in conventional neural network codec training, setting the scaling factor of a channel to be larger than any latent values results in all the latent value in that channel being quantized to 0, meaning that effectively the latent channel is dropped out.

In some aspects, the scaling parameter s may be learned based on the trade-off parameter $\beta$, where $\beta$ balances the distortion and the bit rate. Accordingly, the learned latent scaling parameter s, the channel index, and the tradeoff parameter value $\beta$ may be related such that a large $\beta$ (e.g., more penalty to the rate to achieve a smaller bit rate model) may correspond to large dropout rate (e.g., drop more channels), which corresponds to a large latent scaling parameter s. On the other hand, a large channel index c may corresponds to a large latent scaling parameter s.

The latent scaling parameter s may continuously control the bit rate determined using a soft dropout. That is, rather than imposing a rate penalty that is the same for different latent space dimensions, the rate penalty may be varied or adjusted according to the latent scaling parameter s. For instance, if the absolute value of the scaled latent representation y/s is less than a predefined value (e.g., 0.5), then a channel of the latent representation may be effectively dropped. In some aspects, the predefined value may be or may correspond to a quantization threshold. In an extreme case, when s goes to infinity, all of the latent spaces will be zero and all channels will be dropped.

During training, the tradeoff parameter value $\beta$ may be uniformly (e.g., uniformly in a linear space or log space) sampled (e.g., continuously or as a categorical variable). Different tradeoff parameter values $\beta$ may result in different objective functions (D+$\beta$*R). Accordingly, models with a different bit rate may be produced as smaller tradeoff parameter values $\beta$ may penalize on bit rate less such that models trained on smaller tradeoff parameter values $\beta$ may have a larger bit rate. On the contrary, larger tradeoff parameter values $\beta$ may penalize more on bit rate so the resulting bit rate will be smaller.

In some aspects, the latent scaling parameters may be learned jointly with training the encoder and decoder weights. Alternatively, the weights of the encoder and decoder may be fixed during learning of the latent scaling parameter s. In some aspects, the tradeoff parameter values $\beta$ may also be fixed during learning of the latent scaling parameter s.

The scaled latent y/s may be supplied to a quantization block 608. The quantization block 608 may quantize the scaled latent y/s using a quantization function such as round, for example, to produce a quantized output [y/s]. The quantized output [y/s] is then supplied to an entropy model 610 for arithmetic encoding, which is then communicated via bit stream. The entropy model 610 computes the probability mass of the latent representation which in turn may be used to determine the bit rate of the latent representation. The hyper codec blocks may encode side information as a complement to the information contained in the latent representation.

On the decoder side, arithmetic decoding is conducted on the received bits of the bit stream to recover the quantized output [y/s]. A rescaling using the scaling parameters is applied, via a rescaling block 612, to the quantized output as s [y/s] (essentially a multiply by s). The decoder 604 may process the recovered latent representation to generate a reconstructed input (e.g., image).

Having learned the latent scaling parameter s, the architecture 600 may be operated to communicate the input, such as an image, to a user at a variable bit rate, for example, based the channel conditions.

Figure 6B:
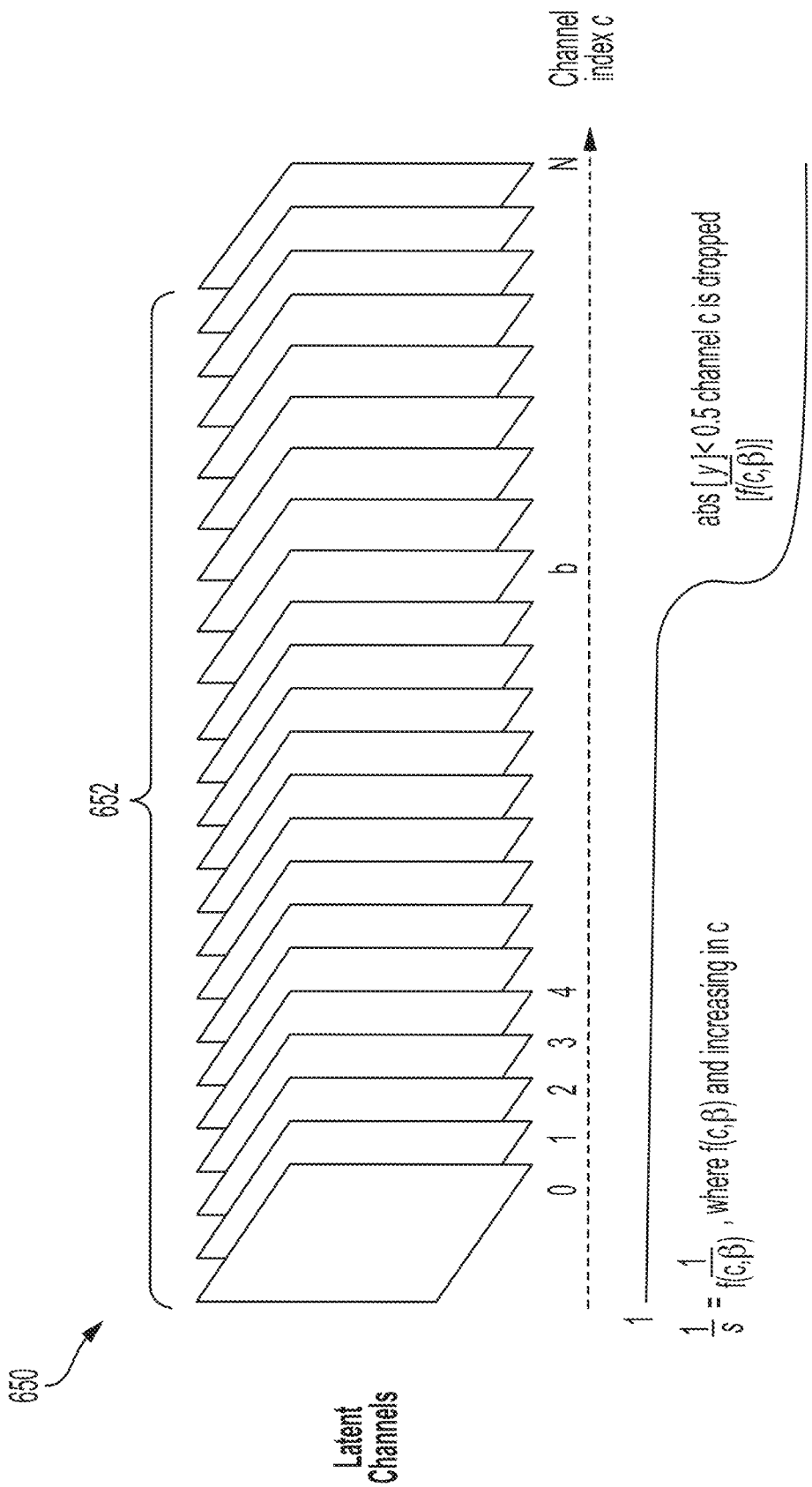
FIG. 6B is a diagram illustrating a channels of a latent space for representing an input, in accordance with aspects of the present disclosure.

FIG. 6B is a diagram 650 illustrating channels of a latent space 652 for representing an input, in accordance with aspects of the present disclosure. Referring to FIG. 6B, the latent space 652 may represent an input such as an image or a video, for example. The latent space 652 may include a set of channels 0-N. Each of the channels may correspond to a different bit rate. The highest bit rate for communicating an input may correspond to communicating all of the N channels of the latent space 652 that represent the input. The bit rate may be reduced by dropping (e.g., not transmitting) one or more channels of the latent space 652. In accordance with aspects of the present disclosure, the bit rate is continuously controlled based on the latent scaling parameter s. That is, if the latent scaling parameter s is such that the absolute value of the scaled latent representation y/s is less than a predefined value (e.g., 0.5), a channel of the latent space 652 may be effectively dropped or truncated. In some aspects, the predefined value may be or may correspond to a quantization threshold. Instead of simply dropping channel above an arbitrary index b, as in a hard drop out, by dropping channels based on a learned scalable which is a function of the channel index and the tradeoff parameter, a multi-rate model target may be achieved for different rate-distortion objectives.

Figure 6C:
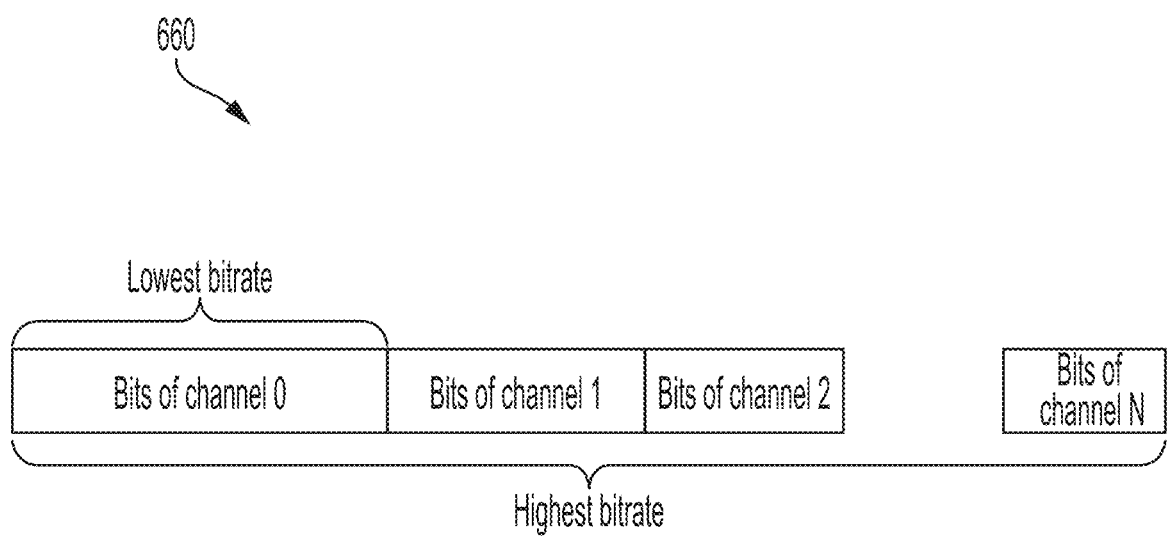
FIG. 6C is a block diagram illustrating an example latent space, in accordance with aspects of the present disclosure.

FIG. 6C is a block diagram illustrating an example latent space 660, in accordance with aspects of the present disclosure. Referring to FIG. 6C, the latent space 660 is divided among N channel. Each of the N channel may include a different number of bits. The highest bit rate includes the bits of all channels of the latent space. As such, the highest bit rate embeds the low rate bits. For instance, the highest bit rate embeds the bits of channel 0. The lowest bitrate may include only the bits of channel 0.

Accordingly, the bit rate may be modified by dropping or truncating channels, and thus, dropping bits of the latent space based on the latent scaling parameter.

Figure 6D:
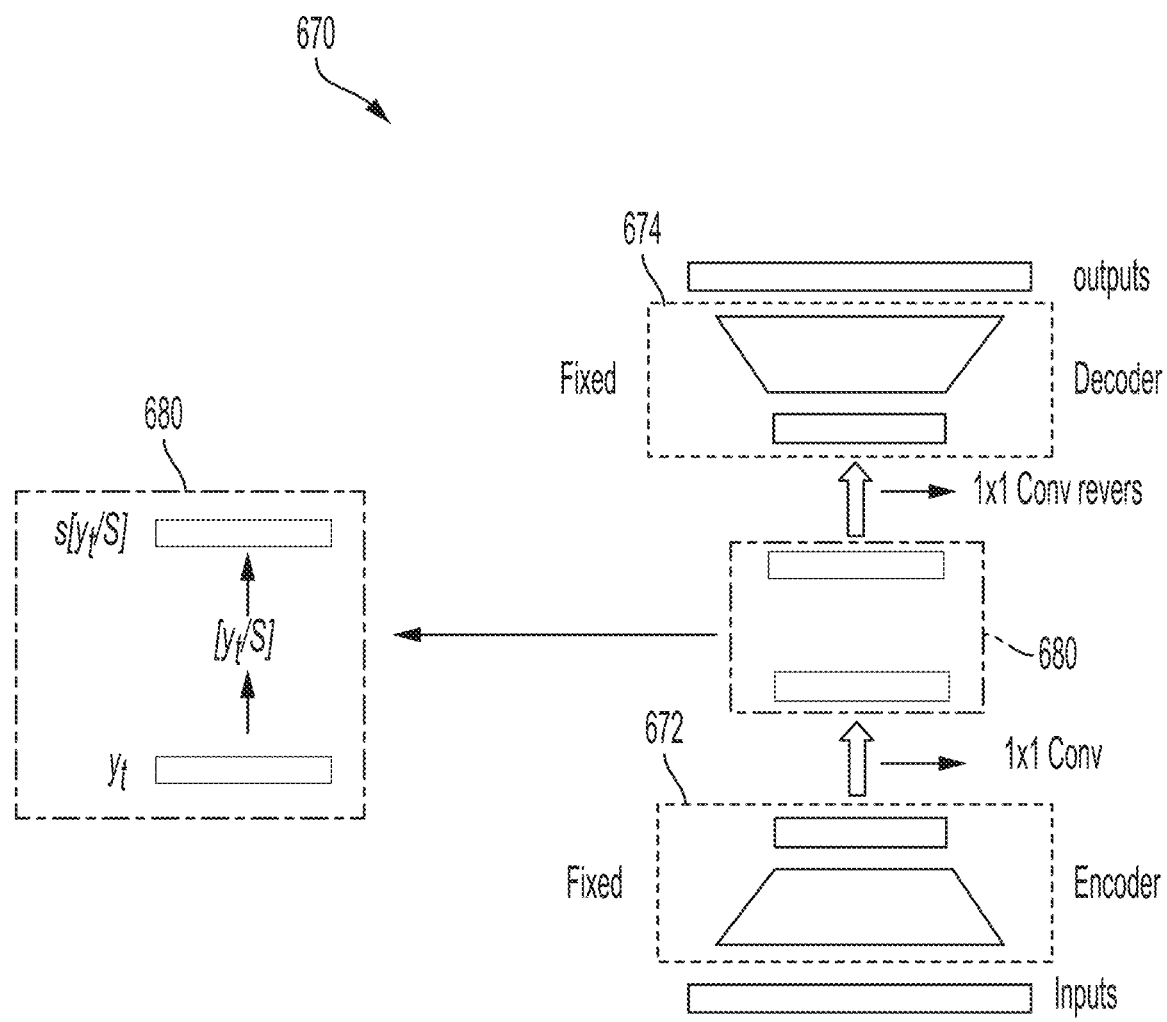
FIG. 6D is a block diagram illustrating architecture for variable bit rate in accordance with aspects of the present disclosure.

FIG. 6D is a block diagram illustrating architecture 670 for variable bit rate in accordance with aspects of the present disclosure. Referring to FIG. 6D, architecture 670 includes an encoder 672 and a decoder 674 and may be configured similar to architecture 600 of FIG. 6A. However, rather than jointly learning the latent scaling parameter along with training the weights of the encoder 672 and the decoder 674, the weights of the encoder 672 and decoder 674 may be fixed during training the invertible mapping 680. That is, a 1×1 transformation and 1×1 inverse transformation of the latent may be learned. In doing so, the latent space may be ordered and the scaling parameter s may be learned. As such, given a latent representation after transformation $y_t$, the latent scaling parameter s may be applied to form a scaled latent $y_t/s$ that is then quantized to $[y_t/s]$ on the encoder side (e.g., 672). Then on the decoder side (e.g., 674), the quantized output $[y_t/s]$ is received. The scaling parameter s is applied to the quantized output as $s[y_t/s]$ (essentially a multiply by s). Thereafter the inverse transformation is performed and the result supplied to the decoder to generate the outputs. In some aspects, the tradeoff parameter values may also be fixed such that only the invertible mapping 680 is trained.

Figure 7A:
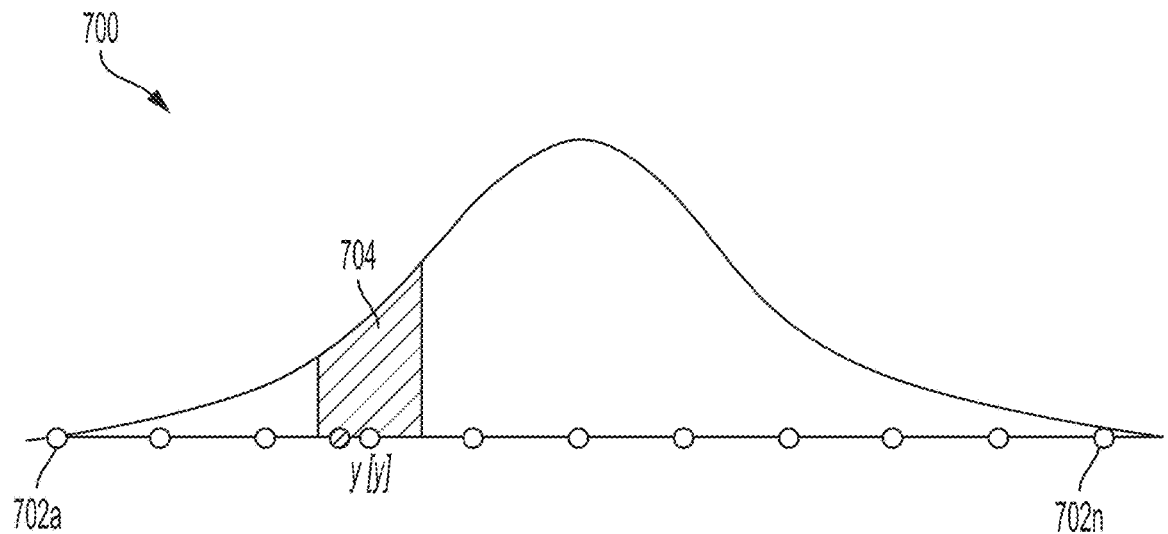
FIGS. 7A and 7B are diagrams illustrating example bell curves for scaling quantization bit width, in accordance with aspects of the present disclosure.
Figure 7B:
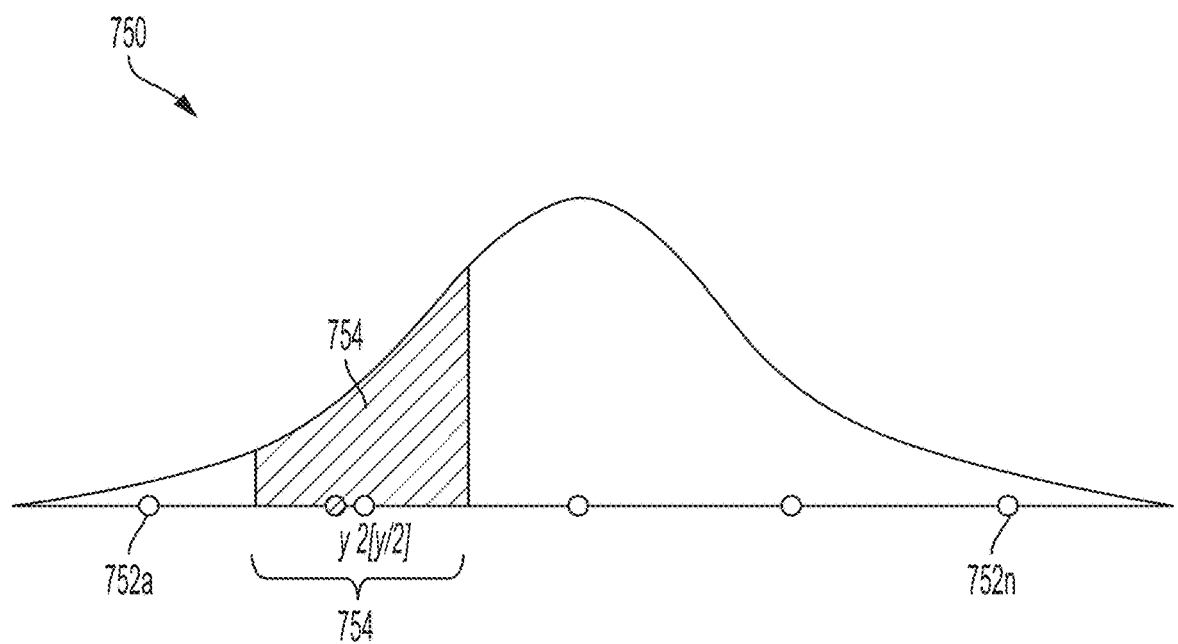

FIGS. 7A and 7B are diagrams illustrating example bell curves 700 and 750 for scaling quantization bit width, in accordance with aspects of the present disclosure. Referring to FIG. 7A, a bell curve 700 and a set of quantization rounding points 702a-n are shown. A scaling parameter s=1 is applied to the latent representation. A scaled latent representation y may be quantized or rounded to one of the quantization rounding points 702a-n according to a quantization threshold (e.g., 0.5). As shown in FIG. 7A, the scaled latent representation y falls within quantization probability 704 (which correspond to a prior probability for the entropy model (e.g., 610 of FIG. 6A) and may be rounded to quantization rounding point [y].

FIG. 7B shows a bell curve 750 after a latent scaling parameter (s=2) is applied. As shown in FIG. 7B, after applying the latent scaling parameter (s=2), the quantization bin widths are larger. That is, the separation between quantization rounding points 752a-n is greater than the separation between quantization rounding point 702a-n (shown in FIG. 7A). Additionally, by applying the latent scaling parameter (s=2), the quantization probability 754 has a larger area than quantization probability 704 (of FIG. 7A). As such, a likelihood of accurately communicating the input may be increased relative to the scenario of FIG. 7A. Therefore, for the scenario of FIG. 7B, less bit rate may be used in encoding the input. Accordingly, more channels of a latent space y represented may be dropped.

Figure 8:
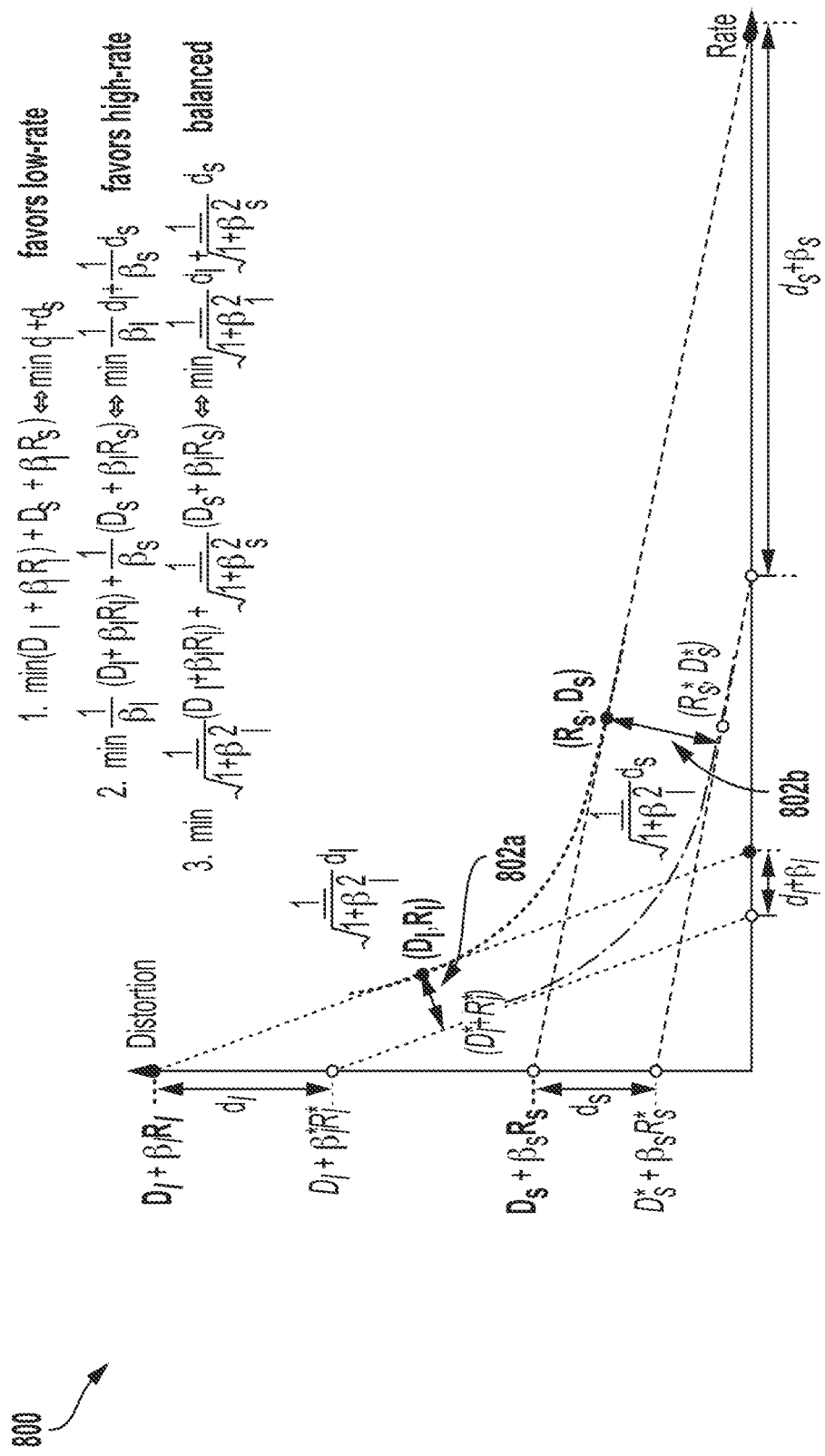
FIG. 8 is a graph illustrating an example of loss equalization, in accordance with aspects of the present disclosure.

FIG. 8 is a graph 800 illustrating an example of loss equalization, in accordance with aspects of the present disclosure. Referring to FIG. 8, example bit rate-distortion curves are shown for different tradeoff parameter values β. During training, the loss value of low bit rate points may be larger than loss values of high bit rate points. In some cases, the loss when the tradeoff parameter β is large is much greater than the loss when the tradeoff parameter β is small. This may be make optimization difficult. As shown in FIG. 8, loss equalization techniques may be applied to overcome this difficulty and facilitate training. In this example, tangent equalization (e.g., 802a, 802b) is applied (e.g., equalization on the rate-distortion plane) to improve performance. A scaling factor may be applied to balance the rate-distortion curves produced with different tradeoff parameters. The loss used for training variable bitrate model may be the aggregation of rate-distortion for a fixed set of β values. Loss equalization means how to aggregate those rate-distortion losses (i.e. $D_i + \beta_i R_i$, i=1, ..., N), where N. In FIG. 8, three types of coefficients to combine those losses are shown. For ease of illustration, N=2 here, where tangent equalization is case 3 (balanced). The first two cases either favors lower bitrate or higher bitrate. That is, case 1 effectively minimizes the sum of dl+ds where typically dl>ds, hence favors lowrate.

In some aspects, plain equalization may be applied. In one example, the loss before training may be given by $L = l_1 + l_2 + \ldots + l_8$. Plain equalization may be applied during training such that a different constant may be tied to each of the loss terms such that the losses in each training iteration may be equalized: $L = l_1^* c_1 + l_2^* c_2 + \ldots + l_8^* c_8$, where $c_i$ are constant such that for any i and j, we have $l_j^* c_j = l_i^* c_i$. Accordingly, after training, the loss at each of the operating points (e.g., corresponding to $l_i$) is equalized.

Figure 9:
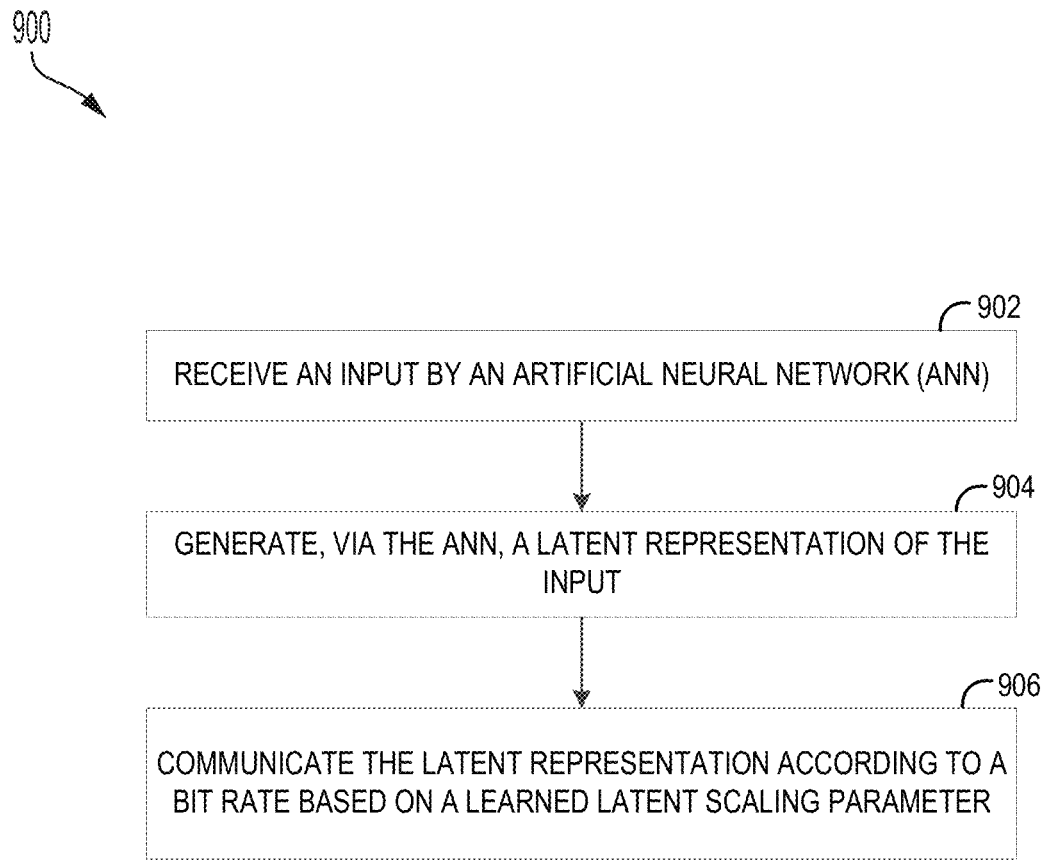
FIGS. 9 and 10 are flow charts illustrating computer-implemented methods for operating an artificial neural network, in accordance with aspects of the present disclosure.

FIG. 9 is a flow chart illustrating a computer-implemented method 900 for operating an artificial neural network (ANN), in accordance with aspects of the present disclosure. As shown in FIG. 9, at block 902, an input is received by the ANN. As described with reference to FIG. 5, an input 502 may be received by an encoder 504. The input 502 may be a visual input such as a video or an image, for example.

At block 904, a latent representation of the input is generated via the ANN. As described with reference to FIG. 5, the encoder 504 may process the image and perform a nonlinear transform parameterized via layers of the CNN to produce a latent representation y of the input 502.

At block 906, the latent representation is communicated according to a bit rate based on a learned latent scaling parameter. As described in reference to FIG. 6A, architecture 600 is configured to provide a variable bit rate via latent scaling. In doing so, the architecture 600 provides a method for continuously controlling latent capacity or rate. The architecture 600 includes an encoder 602 and a decoder 604. The encoder 602 receives an input and transforms the input, such as an image, into a latent representation y. The latent representation y is scaled via a scaling block 606, based on the learned latent scaling parameter s.

The scaled latent y/s may be supplied to a quantization block 608. The quantization block 608 may quantize the scaled latent y/s using a quantization function such as round, for example, to produce a quantized output [y/s]. The quantized output [y/s] is then supplied to an entropy model 610 for arithmetic encoding, which is then communicated via bit stream.

In some aspects, the scaling parameter may be learned based on a tradeoff parameter value $\beta$ where balances the distortion and the bit rate (D+$\beta$*R). Accordingly, the learned latent scaling parameter s, the channel index and the tradeoff parameter value may be related such that a large $\beta$ (e.g., more penalty to the rate to achieve a smaller bit rate model) may correspond to large dropout rate (e.g., drop more channels) which corresponds to a large latent scaling parameter s. On the other hand, a large channel index c may corresponds to large latent scaling parameter s.

Figure 10:
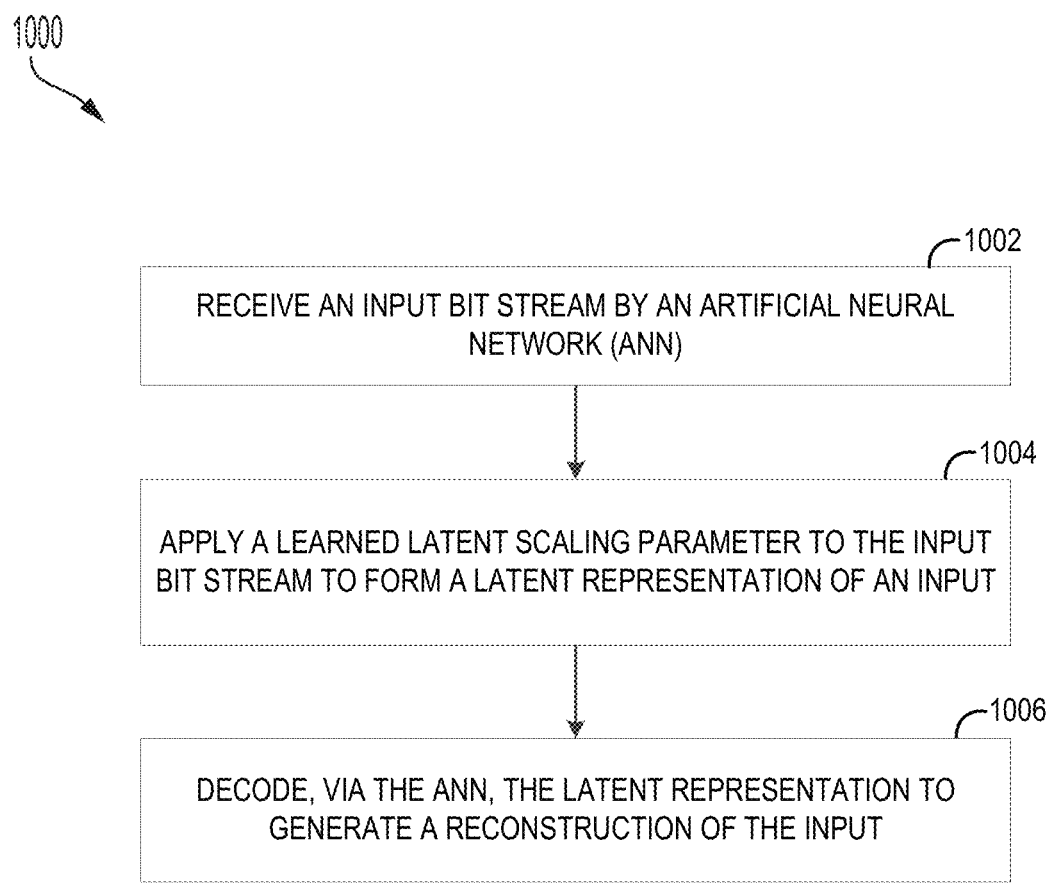

FIG. 10 is a flow chart illustrating a computer-implemented method 1000 for operating an artificial neural network (ANN), in accordance with aspects of the present disclosure. As shown in FIG. 10, at block 1002, an input bit stream is received by the ANN. As described with reference to FIG. 5, a decoder 508 receives a bit stream 506.

At block 1004, a learned latent scaling parameter is applied to the input bit stream to form a latent representation of an input. As described in reference to FIG. 6A, on the decoder side (e.g., 674), arithmetic decoding is conducted on the received bits of the bit stream to recover the quantized output [y/s]. A rescaling using the scaling parameter s is applied, via a rescaling block 612, to the quantized output as s[y/s] (essentially a multiply by s) to recover the received latent representation.

At block 1006, the latent representation is decoded via the ANN to generate a reconstruction of the input. As described in reference to FIG. 6A, the decoder 604 may process the recovered latent representation to reconstruct the input (image). Accordingly, the input (e.g., an image) may be communicated based on channel conditions and in a manner which balances distortion and bit rate. In the case when scaling parameter s is parameterized as a function of $\beta$, the $\beta$ parameter is communicated from a transmitter to a receiver before the bits of the latent representation so that the decoder 604 can correctly compute the probability mass function for each latent representation and carry out entropy decoding.

Implementation examples are described in the following number clauses:

1. A computer-implemented method for operating an artificial neural network (ANN), comprising:
   receiving an input by the ANN;
   generating, via the ANN, a latent representation of the input; and
   communicating the latent representation according to a bit rate based on a learned latent scaling parameter.

2. The computer-implemented method of clause 1, in which the latent scaling parameter is learned based on a channel index and a tradeoff parameter.

3. The computer-implemented method of clause 1 or 2, in which the latent scaling parameter is configured to drop a channel in response to the latent scaling parameter being above a predefined threshold relative to a value of latent representations in the channel.

4. The computer-implemented method of any of clauses 1-3, in which the tradeoff parameter corresponds to a value that balances the bit rate and a distortion.

5. The computer implemented method of any of clauses 1-4, in which the tradeoff parameter comprises an array of different tradeoff parameters trained together during training of the ANN and a loss corresponding to each of the different tradeoff parameters is equalized.

6. The computer-implemented method of any of clauses 1-5, further comprising applying an equalization such that a first loss values of low bit rate points and a second loss values of high bit rate points are equalized.

7. The computer-implemented method of any of clauses 1-6, in which the equalization comprises plain equalization.

8. The computer-implemented method of any of clauses 1-6, in which the equalization comprises tangent equalization.

9. A computer-implemented method for operating an artificial neural network (ANN), comprising:
   receiving an input bit stream by the ANN;
   applying a learned latent scaling parameter to the input bit stream recover a latent representation of an input; and
   decoding, via the ANN, the latent representation to generate a reconstruction of the input.

10. The computer-implemented method of clause 9, in which the latent scaling parameter is learned based on a channel index and a tradeoff parameter.

11. The computer-implemented method of clause 9 or 10, in which the tradeoff parameter corresponds to a value that balances a bit rate and a distortion.

12. An apparatus for operating an artificial neural network (ANN), comprising:
   a memory; and
   at least one processor coupled to the memory, the at least one processor being configured:
      to receive an input by the ANN;
      to generate, via the ANN, a latent representation of the input; and
      to communicate the latent representation according to a bit rate based on a learned latent scaling parameter.

13. The apparatus of clause 12, in which the at least one processor is further configured to learn the latent scaling parameter based on a channel index and a tradeoff parameter.

14. The apparatus of clause 12 or 13, in which the latent scaling parameter is configured to drop a channel in response to the latent scaling parameter being above a predefined threshold relative to a value of latent representations in the channel.

15. The apparatus of any of clauses 12-14, in which the tradeoff parameter corresponds to a value that balances the bit rate and a distortion.

16. The apparatus of any of clauses 12-15, in which the tradeoff parameter comprises an array of different tradeoff parameters trained together during training of the ANN and a loss corresponding to each of the different tradeoff parameters is equalized.

17. The apparatus of any of clauses 12-16, in which the at least one processor is further configured to apply an equalization such that a first loss values of low bit rate points and a second loss values of high bit rate points are equalized.

18. The apparatus of any of clauses 12-17, in which the equalization comprises plain equalization.

19. The apparatus of any of clauses 12-17, in which the equalization comprises tangent equalization.

20. An apparatus for operating an artificial neural network (ANN), comprising:
a memory; and
at least one processor coupled to the memory, the at least one processor being configured:
to receive an input bit stream by the ANN;
to apply a learned latent scaling parameter to the input bit stream recover a latent representation of an input; and
to decode, via the ANN, the latent representation to generate a reconstruction of the input.

21. The apparatus of clause 20, in which the at least one processor is further configured to learn the latent scaling parameter based on a channel index and a tradeoff parameter value.

22. The apparatus of clause 20 or 21, in which the tradeoff parameter value corresponds to a value that balances a bit rate and a distortion.

In one aspect, the receiving means, decoding means, generating means, learning means, communicating means, operating means and/or applying means may be the CPU 102, program memory associated with the CPU 102, the dedicated memory block 118, fully connected layers 362, NPU 428 and or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described without departing from the scope of the claims.

What is claimed is:

1. A computer-implemented method for operating an artificial neural network (ANN), comprising:
   receiving an input by the ANN;
   generating, via the ANN, a latent representation of the input, the latent representation including a plurality of latents;
   applying a respective learned latent scaling parameter to each latent to generate a plurality of respective scaled latents, where each respective learned latent scaling parameter is learned as a function of a respective channel among a plurality of channels and a tradeoff parameter;
   determining that at least one scaled latent associated with at least one channel among the plurality of channels is below a predefined threshold;
   determining not to transmit the at least one channel based on the determination that the at least one scaled latent is below the predefined threshold; and
   transmitting at least one second channel among the plurality of channels.

2. The computer-implemented method of claim 1, wherein the tradeoff parameter corresponds to a value that relates a bit rate of transmission of the at least one second channel and a difference between the input and a reconstruction of the input.

3. The computer implemented method of claim 2, wherein the tradeoff parameter comprises a first tradeoff parameter associated with the at least one channel and a second tradeoff parameter associated with the at least one second channel, the first tradeoff parameter and the second tradeoff parameter being different from one another.

4. The computer-implemented method of claim 3 wherein the first tradeoff parameter and the second parameter are trained such that a loss associated with the first tradeoff parameter and a loss associated with the second tradeoff parameter are equivalent to one another.

5. The computer-implemented method of claim 4, further comprising deriving the first tradeoff parameter and the second tradeoff parameter based on an application of plain equalization.

6. The computer-implemented method of claim 4, further comprising deriving the first tradeoff parameter and the second tradeoff parameter based on an application of tangent equalization.

7. An apparatus for operating an artificial neural network (ANN), comprising:
   a memory; and
   at least one processor coupled to the memory, the at least one processor being configured:
   to receive an input by the ANN;
   to generate, via the ANN, a latent representation of the input, the latent representation including a plurality of latents;
   to apply a respective learned latent scaling parameter to each latent to generate a plurality of respective scaled latents, where each respective learned latent scaling parameter is learned as a function of a respective channel among a plurality of channels and a tradeoff parameter;
   to determine that at least one scaled latent associated with at least one channel among the plurality of channels is below a predefined threshold;
   to determine not to transmit the at least one channel based on the determination that the at least one scaled latent is below the predefined threshold; and
   to transmit at least one second channel among the plurality of channels.

8. The apparatus of claim 7, wherein the tradeoff parameter corresponds to a value that relates a bit rate of transmission of the at least one second channel and a difference between the input and a reconstruction of the input.

9. The apparatus of claim 8, wherein the tradeoff parameter comprises a first tradeoff parameter associated with the at least one channel and a second tradeoff parameter associated with the at least one second channel, the first tradeoff parameter and the second tradeoff parameter being different from one another.

10. The apparatus of claim 9, wherein the first tradeoff parameter and the second parameter are trained such that a loss associated with the first tradeoff parameter and a loss associated with the second tradeoff parameter are equivalent to one another.

11. The apparatus of claim 10, wherein the at least one processor is further configured to derive the first tradeoff parameter and the second tradeoff parameter based on an application of plain equalization.

12. The apparatus of claim 10, wherein the at least one processor is further configured to derive the first tradeoff parameter and the second tradeoff parameter based on an application of tangent equalization.

13. An apparatus comprising:
   means for receiving an input by an artificial neural network (ANN);
   means for generating, via the ANN, a latent representation of the input, the latent representation including a plurality of latents;
   means for applying a respective learned latent scaling parameter to each latent to generate a plurality of respective scaled latents, where each respective learned latent scaling parameter is learned as a function of a respective channel among a plurality of channels and a tradeoff parameter;
   means for determining that at least one scaled latent associated with at least one channel among the plurality of channels is below a predefined threshold;
   means for determining not to transmit the at least one channel based on the determination that the at least one scaled latent is below the predefined threshold; and
   transmitting at least one second channel among the plurality of channels.

14. The apparatus of claim 13, wherein the tradeoff parameter corresponds to a value that relates a bit rate of transmission of the at least one second channel and a difference between the input and a reconstruction of the input.

15. The apparatus of claim 14, wherein the tradeoff parameter comprises a first tradeoff parameter associated with the at least one channel and a second tradeoff parameter associated with the at least one second channel, the first tradeoff parameter and the second tradeoff parameter being different from one another.

16. The apparatus of claim 15, wherein the first tradeoff parameter and the second parameter are trained such that a loss associated with the first tradeoff parameter and a loss associated with the second tradeoff parameter are equivalent to one another.

17. The apparatus of claim 16, further comprising means for deriving the first tradeoff parameter and the second tradeoff parameter based on an application of plain equalization.

18. The apparatus of claim 16, further comprising means for deriving the first tradeoff parameter and the second tradeoff parameter based on an application of tangent equalization.

* * * * *